United States Patent

Murata et al.

[11] 3,902,802
[45] Sept. 2, 1975

[54] PHOTOGRAPHIC DEVICE

[75] Inventors: Shinji Murata; Hitoshi Yanagawa, both of Tokyo, Japan

[73] Assignee: Canon Kabushiki Kaisha, Tokyo, Japan

[22] Filed: June 27, 1974

[21] Appl. No.: 483,674

[30] Foreign Application Priority Data
July 5, 1973 Japan.................................. 48-75936

[52] U.S. Cl. ........................ 355/43; 355/49; 355/66
[51] Int. Cl.² .................... G03B 27/52; G03B 27/70
[58] Field of Search .................... 355/14, 39, 40–43, 355/47–49, 50, 51, 53, 54, 66, 84

[56] References Cited
UNITED STATES PATENTS

| | | | |
|---|---|---|---|
| 3,241,436 | 3/1966 | Thornthwaite et al. | 355/66 X |
| 3,539,257 | 11/1970 | Hoyne et al. | 355/49 X |
| 3,547,535 | 12/1970 | McLean et al. | 355/49 |
| 3,576,365 | 4/1971 | Callum | 355/66 X |
| 3,689,149 | 9/1972 | Livingood | 355/54 X |
| 3,796,489 | 3/1974 | Sone et al. | 355/54 |
| 3,819,264 | 6/1974 | Voorhees | 355/66 X |

Primary Examiner—Richard A. Wintercorn
Attorney, Agent, or Firm—Fitzpatrick, Cella, Harper & Scinto

[57] ABSTRACT

In a photographing device of the present invention, a subject to be photographed and a film for forming an image of the subject thereon are moved opposite in direction each other. As a subject, lengthy web form subjects as well as short sheet like subjects are usable. The image of a subject is photographed on a film on a reduced scale. The photographing device is provided with a device, controlled by pulse signals produced in response to the feeding of the film, for recording index marks on the film. The photographing device is further provided with a switching device to selectingly put different marks on the film in accordance with the form of subjects to be photographed.

12 Claims, 8 Drawing Figures

PATENTED SEP 2 1975

FIG. 5
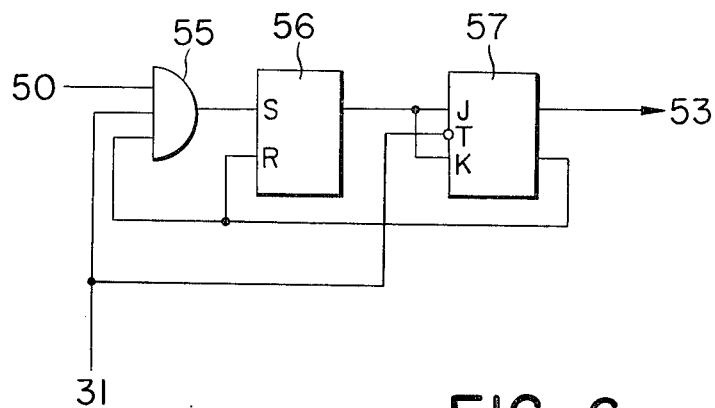
FIG. 6
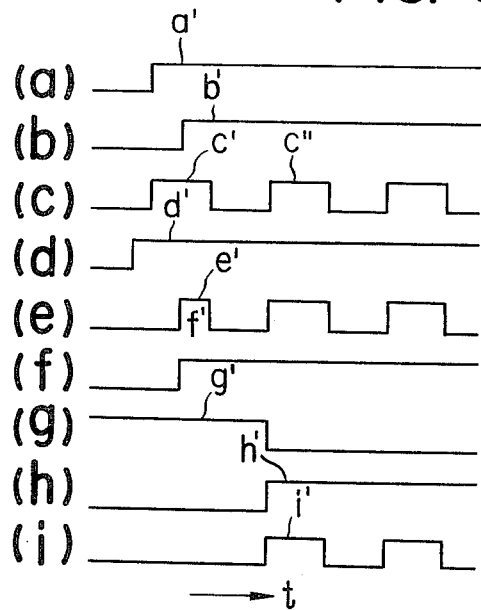
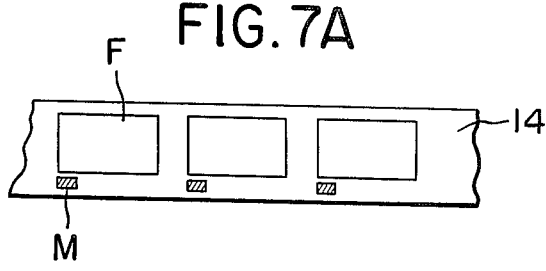
FIG. 7A
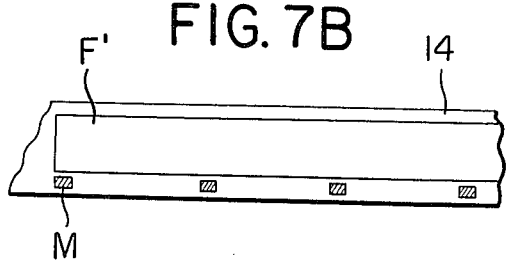
FIG. 7B

PHOTOGRAPHIC DEVICE

BACKGROUND OF THE INVENTION

1. Field of the Invention

This invention relates to a photographing device and, more in particular, to a device which effects exposure while a subject to be photographed is moving and records a light image onto the film moving at a uniform speed in the direction opposite to that of the subject, on a reduced scale.

2. Description of the Prior Art

In general, devices which perform photographing while a subject to be photographed and the film are moving, such as rotary cameras, are used for recording subjects such as literatures, drawings, checks, line printers, or ECGs, on a reduced scale, and are so designed as to record index marks simultaneously with the recording of information for the purpose of searching a desired information from the recorded film.

Earlier method of recording index marks consists in detecting the movement of the subject using a microswitch, and opening and closing the shutter placed on the light path projected from the marking light source responsive to the detecting signals from the microswitch, in order that the light from the marking light source may fall on the film.

According to such a method, when the microswitch has detected the subject to be photographed, the resulting detecting signal opens and closes the shutter; marking light falls only once for the frame of a subject to be photographed. Therefore, when photographing short sheet-like subjects (hereafter called sheet form) such as literatures, drawings and checks, only one marking may be recorded on the film for the subject being photographed. But when photographing long subjects (hereafter called web form) such as line-printer papers from the electronic computers, ECG and EEG papers, only one marking will be recorded on the subject being photographed, making it impossible to search for the desired frame of subject unless the long recorded information is all inspected from the first frame to the last frame.

SUMMARY OF THE INVENTION

A primary object of this invention therefore is to provide a photographing device to which a sheet form and a web form is usable as a subject and which records markings on a film in different mode depending on the form of a subject thereby overcoming the aforementioned disadvantages inherent to the prior art.

A further object of this invention is to provide a device which can take photographs while a subject and a film are moving, comprising means for feeding the film, means for producing pulse signals at a determined interval responsive to the feeding of film and is interlocked to said feeding means, means placed on the path along which the subject moves to produce detection signals by detecting the subject, means controlled by the detection signal of said detection means and by the pulse signal of the pulse-generating means to record at least one index mark on the film, and switching means which uses the sheet form and the web form as a subject is coupled to said recording means in order to select the mode of mark that will be recorded on the film depending on the form of the subject, wherein when the subject of the sheet form is being photographed on the film, the first marking is also photographed for the subject, and when the subject of the web is being photographed, the second marking is photographed for the subject.

BRIEF DESCRIPTION OF THE DRAWING

FIG. 5 is an electric circuit diagram showing the synchronization control circuit, FIG. 6 (a)–(i) is a diagram of waveforms representing the signals at respective parts of FIGS. 4 and 5, and FIG. 7 (A) and (B) shows front views of microfilms on which are recorded markings of different modes by the aforementioned rotary camera.

DESCRIPTION OF THE PREFERRED EMBODIMENTS

Figure 1:
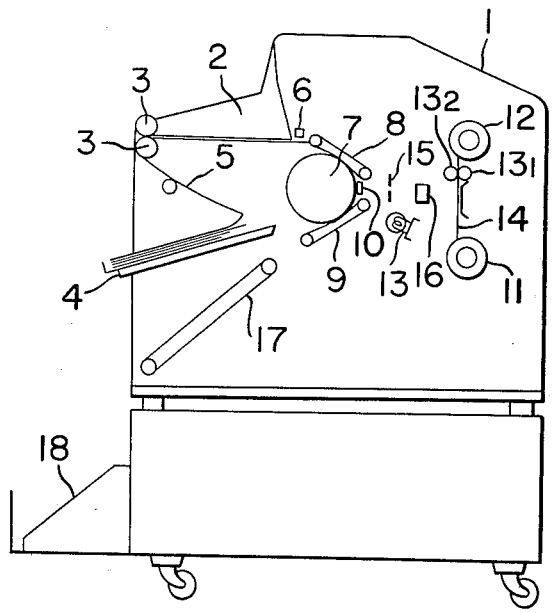
FIG. 1 is a schematic diagram showing a setup of the rotary camera which is an embodiment of this invention.

The invention will be illustrated in detail hereinbelow with reference to an embodiment shown in the drawings.

FIG. 1 shows a rotary camera of this invention, in which reference numeral 1 is a camera body, 2 is a subject-feeding port positioned on the upper part of the camera body, 3 represents guide rollers for the subject, 4 is a rack for holding the subject and is provided in front of the camera body 1, and the subject 5 of long web form such as ECG or a line-printer paper is placed on the rack and is guided to the feeding port 2 by the guide rollers 3. Subjects of sheet form such as checks and documents are fed directly into the camera by hand or by an automatic feeding means through the feeding port 2. 6 is a subject detector switch composed of a microswitch and is placed on the path along which the subject moves, 7 is a subject-transfer roller driven by the driving motor (not shown) and transfers the subject fed into the camera through the feeding port 2 through the exposure position. 8 and 9 are endless belts span over pairs of rollers and are in contact with the periphery of the transfer roller 7 to hold the subject, and 10 is a glass plate to form an exposure surface. The subject being transferred is exposed between the glass plate 10 and the transfer roller 7. 11 is a film-feeding reel, 12 is a film-take-up reel, and $13_1$ and $13_2$ are a capstan and a pinch roller, respectively, to transfer the microfilm 14. The capstan and the pinch roller are driven by the driving notor (not shown) and transfer the microfilm 14 in the direction opposite to that of the subject 5 and at a speed equal to the speed of the light image of the subject 5. The motor for driving the capstan may also drive the roller which transfers the subject. 13 is an exposure lamp for illuminating the subject 5 passing through the exposure position, 15 and 16 are a slit plate and an image-forming lens positioned between the subject 5 and the microfilm 14, and permits the light image of the subject illuminated at the exposure position to fall onto the microfilm 14 through the slit on a reduced scale. 17 is a belt running over a pair of rollers and discharges the subject, and 18 is a box to receive the subject.

Figure 2:
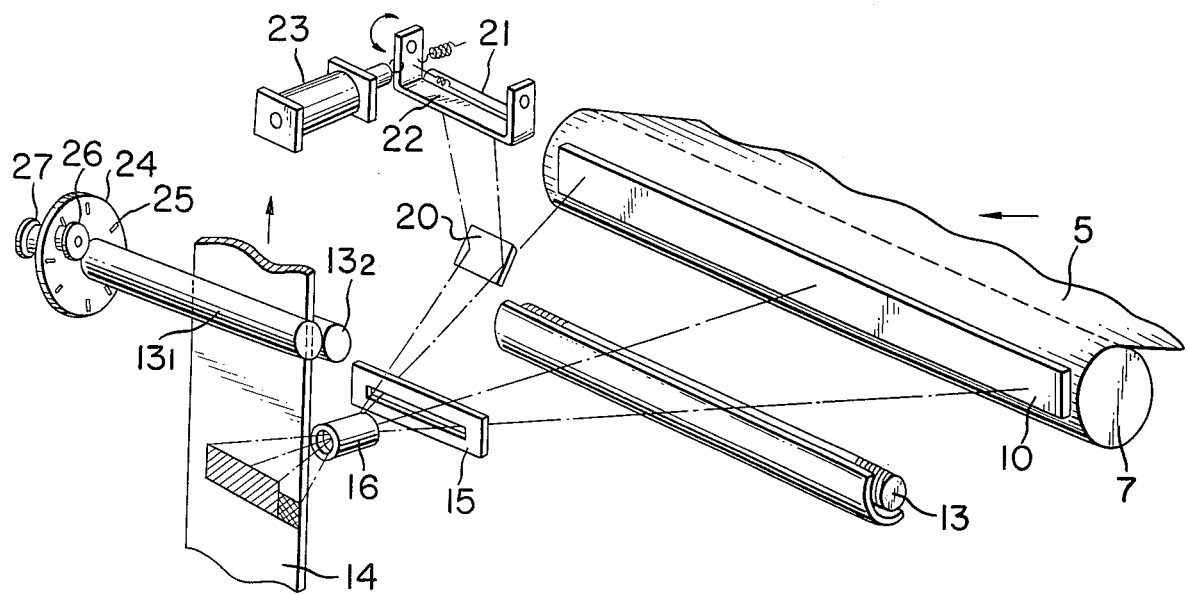
FIG. 2 is a perspective view in which major parts of FIG. 1 are enlarged.

Referring to FIG. 2, numeral 20 stands for a reflector mirror positioned out of the effective photographing light path of the subject and is inclined with respect to the light axis within the photographing range of the image-forming lens 15, 21 is a light source of wire shape for recording the marking, 22 is a shutter positioned rotatably between the mirror 20 and the wire-shaped light source 21, and 23 is a plunger which opens and closes the shutter 22 according to the electric signals mentioned later. 24 is a disc attached to the rotary shaft of the capstan $13_1$ and has a number of slit holes 25 on its periphery maintaining a determined distance. 26 and 27 are a light source and a lightreceiving element provided with the disc 24 interposed therebetween; when the light ray from the light source 26 has passed through the slit hole 25 owing to the rotation of the disc 24, the light-receiving element 27 upon receipt of the light ray produces a pulse signal.

Figure 3:
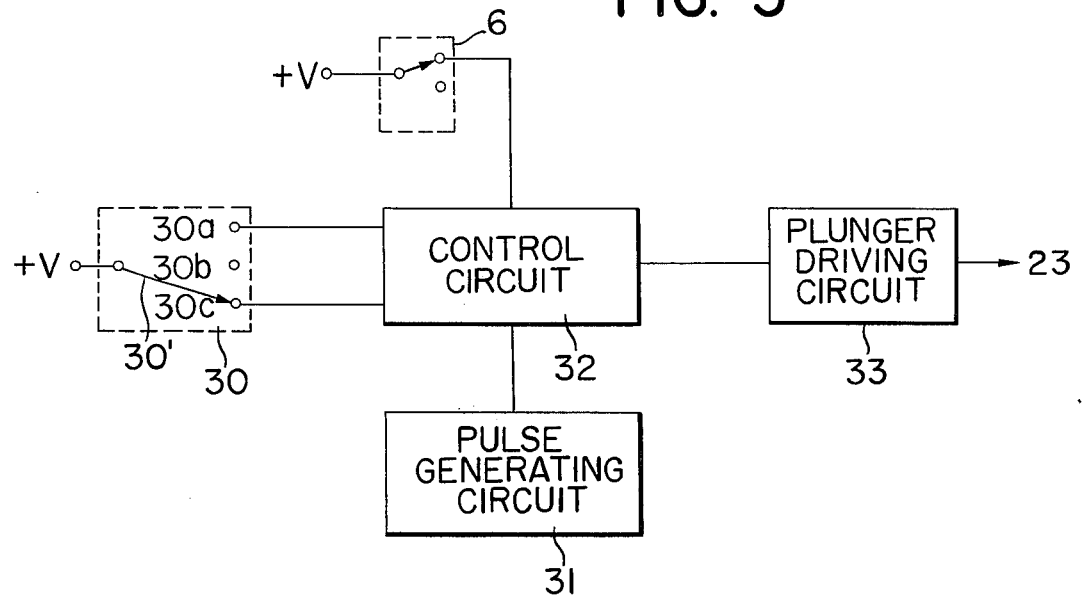
FIG. 3 is a block diagram showing the circuit of the aforementioned rotary camera.

FIG. 3 shows an electric circuit for recording marking on the film in the aforementioned camera. In FIG. 3, reference numeral 30 stands for a switching mechanism to select the recording mode of marking depending on the form of the subject, and is composed of a moving contact piece 30' and three contacts 30a, 30b and 30c. By setting the moving contact piece 30' to the contact 30a, the switching mechanism produces a first signal so that the first marking is recorded on the film for the photographing of subject, i.e., onto the sheet form such as document or check. By setting the moving contact piece 30' to the contact 30b, the switching mechanism does not produce the signal so that no marking is recorded for the photographing of the subject. By setting the moving contact piece 30' to the contact 30c, the switching mechanism produces a second signal so that the second marking is recorded on the film for the photographing of the subject, i.e., on the long web form such as ECG. In this embodiment, the first marking assumes the shape of a single code mark for the recorded information of one frame, and the second marking assumes the shape of a plurality of code marks lined in parallel maintaining a determined distance in the lengthwise direction of the film for the recorded information of one frame.

Figure 4:
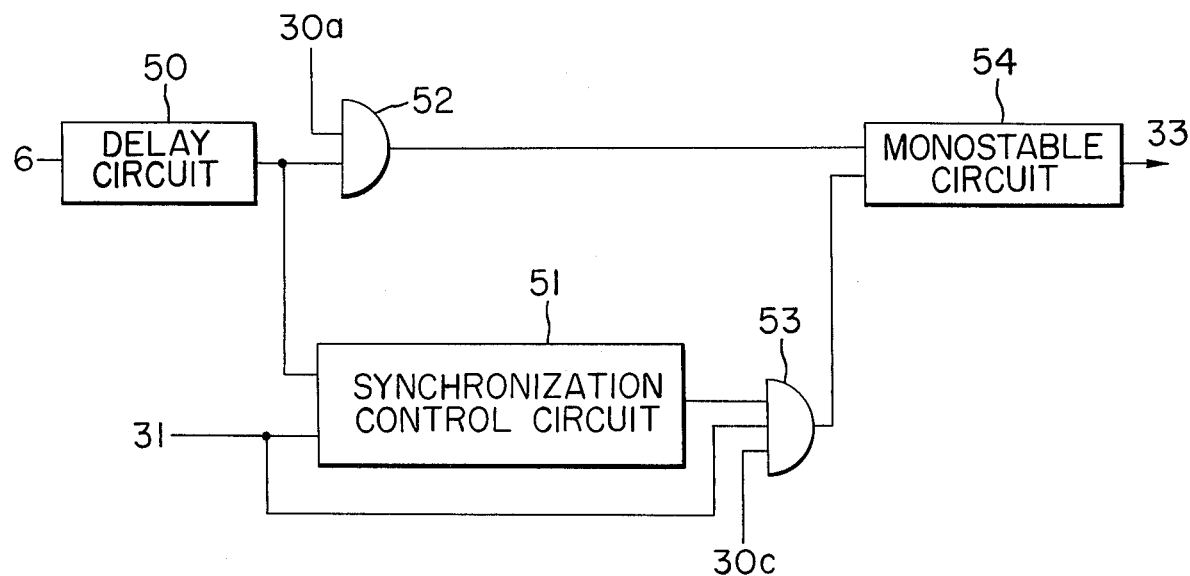
FIG. 4 is an electric circuit diagram showing the control circuit.

31 is a pulse generator circuit having said light-receiving element 27 and produces pulse signals at a determined interval and is interlocked to the film feeding. 32 is a control circuit which receives the signals from the subject detector switch 6 and from the pulse generator circuit 31, and drives the driving circuit 33 to drive plunger 23. Therefore, the shutter 23 is opened and closed by the signal from the control circuit 32 via the driving circuit 33. The control circuit 32, as shown in FIG. 4, consists of a delay circuit 50 which delays the detection signal from the subject detector switch 6 and sends the delay signal after a predetermined time has passed, an AND gate 52 which receives as inputs the delay signal from the delay circuit 50 and the first signal from the switch 30 and gates when the two signals have coincided, a synchronization control circuit 51 which receives the delay signal from the delay circuit 50 and the pulse signal from the pulse generator circuit 31 and produces a snychronizing signal upon receipt of the initial pulse signal produced from the pulse generator circuit after a delay signal has been produced for the purpose of bringing the delay signal in synchronism with the pulse signal, an AND gate 53 which receives as inputs the synchronizing signal from the synchronization control circuit 51, the pulse signal from the pulse generator circuit 31 and the second signal from the switch 30 and gates when each of the input signals is coincided, and a monostable circuit 54 which receives outputs from AND gates 52 and 53. The synchronization control circuit 51 prevents the index marking from being not recorded on the first frame of the film, that occurs due to out of synchronism between the delay signal produced by the delay circuit 50 after the subject is detected by the detector switch 6 and the pulse signal produced from the pulse generator circuit 31. FIG. 5 shows the aforementioned synchronization control circuit consisting of AND gate 55, R-S flip-flop 56, and synchronization-type J-K flip-flop 57. The output of the pulse generator circuit 31 is connected to the input of the AND gate 55 and to the synchronization input terminal T of the J-K flip-flop 57, and the output of the delay circuit 50 is connected to the input of AND gate 55. The output of AND gate 55 is connected to the set input terminal S of the flip-flop 56, and the set output terminal of the flip-flop 56 is connected to the input terminals J and K of another flip-flop 57. The J output terminal of the flip-flop 57 is connected to the input of the AND gate 53, and the K output is connected to the input of AND gate 55 and to the reset input terminal R of the flip-flop 56.

Being constructed as mentioned above, if now the sheet form is used as the subject, the switch 30 should be set to the contact 30a. The subject fed into the camera through the feeding port 2 is transferred by the transfer roller 7 and when passing through the detector switch 6, the detector switch 6 produces a detection signal which will be sent to the delay circuit 50 and to the motor for driving the capstan roller $13_1$, so that the motor is driven to feed the film. As the subject reaches the exposure position, the delay circuit 50 produces a delay signal. At this moment, since the switch 30 has been set to the contact 30a to produce the first signal, the AND gate 52 is gated. The gate signal from the AND gate 52, via the monostable circuit 54, drives the plunger driving circuit 33, causing the shutter 23 to open for a predetermined period of time. As a result, the light from the wire-shaped light source 21 is recorded as an index marking on one side of the subject on the film through the reflector mirror 20 and the image-forming lens 16. The so produced microfilm has one code marking M for one record frame F as shown in FIG. 7 (A).

Next is illustrated the case of using the web form as the subject with reference to signal waveforms of FIG. 6. By setting the switch 30 to the contact 30c, the switch 30 produces the second signal d' as shown by FIG. 6 (d). Also, referring to FIG. 5, the flip-flop 57 at this moment is in the reset state to produce a signal from the K output terminal; this signal is sent to the AND gate 55 and to the flip-flop 56, rendering the flip-flop 56 to assume the reset state.

The long subject fed into the camera through the guide roller 3 and the feeding port 2 is transferred by the transfer roller 7 and when passing through the detector switch 6, the detector switch 6 produces a detection signal a' (see FIG. 6 (a)). The detection signal a' is sent to the delay circuit 50 and to the motor for driving the capstan roller $13_1$, so that the motor is driven to feed the film 14. As the subject reaches an exposure position, the delay circuit 50 produces a delay signal b'

(see FIG. 6 (b)) which will be sent to the AND gate 55 of the synchronization control circuit 51.

Also, as the disc 24 rotates being interlocked with the feeding of film and as the light-receiving element 27 receives the light which has passed through the slit hole 25, the pulse generator circuit 31 produces pulse signals c' (see FIG. 6 (c)) at a predetermined interval, and the pulse signals are sent to the AND gate 55. As mentioned earlier, the K output terminal of the flip-flop 57 is producing signals; hence with the delay signal b' and pulse signal c' being sent to the AND gate and the two signals being in coincidence, the AND gate 55 undergoes gating. The gate output signal e' (see FIG. 6 (e)) then sets the flip-flop 56. The set output signal f' (see FIG. 6 (f)) of the flip-flop 56 is sent to the input terminals J and K of the J-K flip-flop 57. But the flip-flop 57 as indicated by the K output signal g' of flip-flop 57 of FIG. 6 (g), is still in the reset state. Hence the AND gate 53 does not gate and the shutter 22 is kept closed even if the tip of the subject passes through the exposure position. Then the pulse generator circuit 31 produces a pulse signal c'' which will enter to the synchronization input terminal T of the flip-flop 57, causing the flip-flop 57 to be set; the signal h' (see FIG. 6 (h)) of the J output terminal is sent to the AND gate 53. At this time, since the second signal d' (see FIG. 6 (d)) has been produced from the switch 30, the pulse signal c'' produced by the pulse generator circuit 31 and sent to the AND gate 53 causes AND gate 53 to gate. The gate signal i' (see FIG. 6 (i)) from the AND gate 53 causes the plunger driving circuit 33 to work via the monostable circuit 54 rendering the shutter 22 to open for a predetermined period of time. Then while the same subject is being sent, the shutter opens for every production of the pulse signal, in order that the light from the wire-shaped light source 21 is recorded intermittently for several times on the film to establish markings. The microfilm so produced has a plurality of code markings M maintaining a definite clearance for one long record frame F' as shown in FIG. 7 (B).

Next, where it is not required to record markings on the film, the switch 30 is set to the contact 30b. This does not send signals to the AND gate 52 or 53. AND gates do not gate, so that the shutter 22 is kept closed, and no marking is recorded on the film.

The distance between the index markings can be varied freely by changing the clearance or position of the slit holes on the disc 24. The capstan roller $13_1$ which feeds the microfilm 14 has been linked to the disc 24. Therefore, variation in revolution of the motor for driving the capstan caused by fluctuation of power supply voltage or variation in revolution due to fluctuation of frequency of the power supply, does not affect the index markings which are recorded on the film 14 maintaining a determined clearance. Where the clearance between the index markings on the film is not so strictly required, the shutter of the light source for index markings may be made to open and close by another electrical or a mechanical method.

Also the pulse generator is not limited to the above-mentioned one but may be used in a variety of forms. As mentioned above, according to this invention, it is possible to record markings of different shapes automatically onto the film depending on the form of the subject, permitting the movement of the subject and the film, contributing to a simple and easy automatic searching system.

Although the invention was illustrated specifically with reference to an embodiment mentioned in detail in the foregoing, it should be noted that the invention is susceptible to a variety of modifications within the scope and spirit of the invention which is set forth in the following claims.

I claim:

1. A photographing device which effects exposure to record a light image of an object onto a film while the object and the film are moving, comprising;
   means to feed the film;
   means to produce pulse signals at a predetermined interval responsive to the film fed;
   means positioned on the path along which the object moves in order to detect the object;
   means controlled by the detection signal from said detecting means and by the pulse signal from the pulse generating means in order to record at least one index mark on the film; and
   switching means which uses a sheet form and a web form as the object and is coupled to said recording means in order to select the mode of mark that will be recorded on the film depending on the form of the object; wherein when the object of the sheet form is being photographed on the film, the first mark is also photographed for the object, and when the object of the web form is being photographed, the second mark is photographed for the object.

2. A photographing device according to claim 1 wherein said feeding means has a pair of driving rollers, and said pulse generating means including a disc which rotates together with said driving rollers and having slit holes maintaining a predetermined clearance on the periphery of the disc, a light source placed on one side of said disc, and a light-receiving element placed on the other side of the disc to produce pulse signals upon receipt of light from the source of light through slit holes of the disc.

3. A photographing device according to claim 1 wherein said mark recording means includes a mark generator means which projects a light ray recorded as a mark onto the film, and a control means coupled to said mark generator means to interrupt the light ray projected by the mark generator means depending on the form of the object, in order to control the number of marks that will be recorded on the film.

4. A photographing device according to claim 3 wherein said control means includes a delay circuit which receives the detection signal and produces a delay signal after a predetermined period of time has passed, a first gate means which, when the switching means is set for the sheet form, gates by the delay signal from the delay circuit to interrupt the light ray projected by the mark generator means, and a second gate means which when the switching means is set for the web form, gates by the delay signal from the delay circuit and by the pulse signal from the pulse generating means in order to interrupt the light ray projected by the mark generator means.

5. A photographing device according to claim 4 wherein said second gate means includes a synchronization control circuit which produces a synchronizing pulse upon receipt of the initial pulse signal from the pulse generating means after the signal from the delay circuit has been produced to bring the delay signal into synchronism with the pulse signal, and a gate circuit which receives as inputs the synchronizing signal from the synchronization control circuit and the pulse signal from the pulse generating means to gate upon receipt of both inputs.

6. A photographing device according to claim 3 wherein said mark generator means includes a linear light source, a shutter placed in front of said linear light source, and an optical means which directs the light from the linear light source toward the side of the film, and wherein the light from the linear light source is recorded on the film as a mark.

7. A flow camera which effects exposure while an object and a film are moving and records a light image of the object onto the film on a reduced scale, comprising;
a camera body;
an optical lens positioned in the camera body to project the light image of the object onto the film;
a roller which transfers the object through the exposure position;
a detector positioned on the path along which the object moves to detect the feeding of the object;
a drive roller which feeds the film at a speed equal to that of the light image of the object and in the direction opposite to that of the object;
a pulse generator connected with said drive roller to produce pulse signals at a predetermined interval responsive to the feeding of film;
a light source positioned in the camera body to project a light ray recorded as a mark onto the side of the film;
a shutter positioned in front of said light source;
a control circuit which receives the signal from said detector switch and the pulse signal from the pulse generator to open and close said shutter depending on the form of the object; and
a switch coupled to said control circuit to select the number of marks that will be recorded on the film depending on the form of the object.

8. An apparatus for recording on a film an index mark and an image of a card-like or long web-like document, comprising:
means for feeding the film to an exposure station during photographing;
means for projecting the image of the document onto a first position of the film;
means for recording the index mark on the film at a second position of the film, said index mark recording means emitting light having a wave length to which the film is sensitive;
means for detecting the document which is fed to the exposure station;
means for generating signals in response to said detecting means at predetermined intervals;
means for controlling said index mark recording means to change a mode of index mark recording operation in response to the signals from said detecting means and said signal generating means; and
means for selecting the mode of the index mark recording operation in response to the form of the document to be recorded, said selecting means being coupled with said control means.

9. An apparatus according to claim 8, wherein said control means, when the card-like document is selected, permits one shot of the light emission to be incident onto the film for a predetermined time from said index mark recording means; and
when the long web-like document is selected, said control means permits a plurality of shots of the light emission to be incident onto the film for predetermined times from said index mark recording means.

10. An apparatus according to claim 8, further comprising:
means for shielding the light from said index mark recording means; and
a circuit for controlling said shielding means, said control circuit, when the card-like document is fed, permitting a first mark to be recorded on the film, and when the web-like film is fed, permitting a second mark to be recorded on the film.

11. An apparatus according to claim 10, wherein said control circuit receives, when the card-like document is selected, a first signal to actuate said shielding means by one time, while said control receives, when the web-like document is selected, a second signal circuit to actuate said shielding means a plurality of times.

12. An apparatus according to claim 11, wherein said selecting means includes a switch for preventing the recording of the index mark.

* * * * *